United States Patent [19]

Prosenbaüer

[11] Patent Number: 4,520,718
[45] Date of Patent: Jun. 4, 1985

[54] EQUIPMENT FOR MASSAGING OF MEAT

[75] Inventor: Otto Prosenbaüer, Vienna, Austria

[73] Assignee: Inject Star Pökelmaschinen Gessellschaft m.b.H., Vienna, Austria

[21] Appl. No.: 612,823

[22] Filed: May 22, 1984

[30] Foreign Application Priority Data

May 27, 1983 [AT] Austria .............................. 1957/83

[51] Int. Cl.³ .............................................. A23B 4/02
[52] U.S. Cl. ..................................... 99/535; 366/185; 366/233
[58] Field of Search ................. 99/516, 517, 534, 535, 99/348, 472; 366/219, 220, 233, 45, 185, 139; 69/30

[56] References Cited

U.S. PATENT DOCUMENTS 3,421,744  1/1969  O'Connell ............................ 366/45

FOREIGN PATENT DOCUMENTS 2811584  9/1979  Fed. Rep. of Germany ...... 366/185
2460113  2/1981  France ................................. 99/535

Primary Examiner—Timothy F. Simone
Attorney, Agent, or Firm—Townsend and Townsend

[57] ABSTRACT

An equipment for massaging meat has a frame which is provided with a supporting member for a container, being separable from the frame, for the meat to be massaged. The container is axially symmetric, preferably cylindrical, in shape and has at its one front end a bottom provided with a chassis and at its other front end a charging opening which can be closed by a cover. The container is introduced into the supporting member in upright position which is then tilted by means of a tilting device around a horizontal tilting axis normally extending to the container axis until the container assumes a lying position. The supporting member is provided with bearing pulleys for the container on which the container rests in its lying position. At least one bearing pulley can be driven, so that the container can be rotated in its lying position, whereby the meat contained within the container is massaged. The supporting member can, together with the lying container supported thereon, be tilted by means of the tilting device into an inclined discharge position, in which the charging opening is located below and the container content is discharged via the charging opening.

20 Claims, 6 Drawing Figures

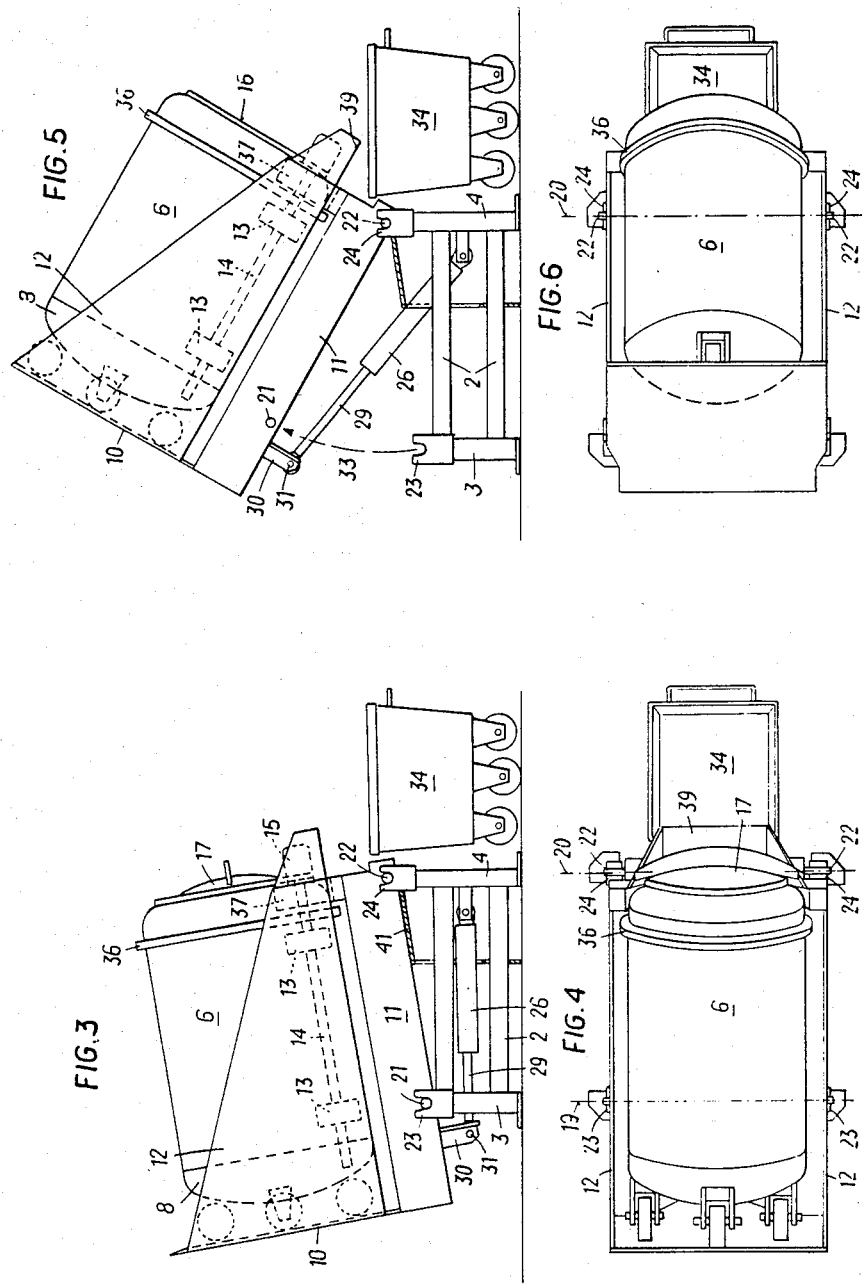

EQUIPMENT FOR MASSAGING OF MEAT

BACKGROUND OF THE INVENTION

The invention refers to an equipment for massaging of meat within a rotating container.

There are already known equipments for the massaging of meat and comprising a frame into which an axially symmetric, in particular cylindrical container, being provided at its bottom with a chassis and preferably with a charging opening closeable by means of a cover, for the meat to be massaged can be moved in upright position and can be swivelled into a lying position by means of a supporting member tiltable relative to the frame around a horizontal tilting axis, noting that the supporting member is provided with bearing pulleys for the container, at least one of the shafts of the bearing pulleys being arranged for being driven for the purpose of rotating the container around its axis in its lying position, and noting that for tilting the supporting member a tilting drive, in particular a pressurized fluid cylinder, is provided in or on the frame. These equipments provide the possibility that the meat to be treated always remains within the container not only during the massaging step but also during charging the equipment and during removal from this equipment, noting that the equipment allows the treatment of different containers in succession, so that the container can also be used for other purposes, in particular for transporting the meat to other treatment equipment, for example automatic pickling machines and so on. The only drawback of the known equipment consists in that it is not possible to discharge the meat from the container immediately after having finished the massaging step. For emptying the container this container must be tilted back into upright position and be removed out of the frame of the equipment or this container must be lifted off the supporting member by means of a crane and must, for being emptied, be lifted at its bottom. In particular the last operation step can not be performed in a simple manner, requires considerable auxiliary equipment and can not be performed without problems on account of the high weight of the containers filled with meat. Emptying of the containers can, when using the known equipment, not be performed in a rapid and simple manner.

SUMMARY OF THE INVENTION

It is an object of the invention to provide an equipment for the massaging of meat which allows to empty the containers within the equipment itself in a rapid and simple manner.

It is a further object of the invention to provide an equipment for the massaging of meat in which the containers can be emptied essentially with the same devices which are provided for tilting the container from its upright position into its lying position.

It is a further object of the invention to design an equipment for massaging meat such that, for the purpose of emptying the container, this container need not be lifted to such a high level as was necessary up till now, and thus also the energy consumption is reduced.

It is a further object of the invention to design an equipment for the massaging of meat such that the equipment can easily be operated.

It is a further object of the invention to design an equipment for the massaging of meat such that transfer of the massaged meat from the container into an other container, for example a transport carriage, is facilitated.

In the equipment according to the invention, the container is further tilted from its lying position into an inclined discharge position in which the supply opening is downwardly directed. In this manner, the container remains rested on the supporting member during the discharge step, so that separate lifting means or supporting means for the container are not necessary when emptying the container. Above all, further tilting movement of the supporting member from the lying position, preferably approximately horizontal position, associated with the massaging operation into the discharge position results in a substantial reduction of operation time and of energy consumption, because the center of gravity of the container need not be lifted relative to its massaging position to such an extent as was up till now necessary by using a crane for the purpose of emptying the container. Emptying of the container by means of the equipment according to the invention can thus substantially more rapidly and more simply be performed than with the known equipment and, in addition, no specially skilled personnel is required for operating the equipment according to the invention.

It is within the spirit of the invention to further tilt the supporting member into the discharge position of the container around the same tilting axis around which the supporting member is tilted from that position of the container, in which the container is moved into the equipment, into the massageing position of the container. However, more favourable is the preferred modified embodiment of the invention, in accordance to which a further tilting axis extending in parallel relation to the mentioned tilting axis and preferably arranged at a higher level than said mentioned tilting axis is provided, around which further tilting axis the container resting on the supporting member can be tilted, preferably by means of the same tilting drive, into the discharge position. In this manner, the whole tilting movement of the container from its position after having been introduced into the equipment (in short entered position) into its discharge position is sequentially effected around two tilting axes separated one from the other. This provides the advantage of simplifying the construction and of reducing the energy consumption by shortening the distance over which the total center of gravity of the container must be lifted. If the tilting axis used for attaining the discharge position is located at a higher level than the other tilting axis, the container need only slightly be lifted if it is not intended to discharge this container. By using the same tilting drive for attaining the massaging position and the discharge position, the expenditure with respect to apparatus design is reduced.

According to a further development of the invention, there are provided on the supporting member two pairs of pins having the axes extending in horizontal direction, said pins forming the tilting axes and alternately engaging forks of the frame, which forms are open in upward direction and coordinated to said both tilting axes. In this manner, the tilting movement is automatically transferred from one tilting axis to the other tilting axis if the container rests with all four pins within the forks forming the bearings for the pins. When further actuating the tilting drive, the previously acting pins are lifted out of their forks so that, starting from this moment and till arriving at the discharge position, only the previously not active pins form together with their coordinated forks the bearing for the tilting movement. This construction provides the possibility to lift the supporting member from the remaining frame parts after having loosened the tilting drive and to later introduce the supporting member again, for example for the purpose of maintainance or repair. Loosening of the tilting drive when thus lifting the supporting member can be even renounced if, according to a further development of the invention, the piston rod of a pressurized fluid cylinder pivotally linked to the frame is pivotally linked to the supporting member at a position located, in the entered position of the container, below that axis around which the supporting member is tilted into the position provided for rotating the container, noting that the pivotal link of the pressurized fluid cylinder on the frame is located at a lower level than that axis around which the container is tilted into its discharge position. The mentioned pivotal link of the piston rod and of the pressurized fluid cylinder, respectively, to the supporting member and the frame, respectively, can follow the lifting movement of the supporting member when lifting same from the frame until the maximum possibility of extending the piston rod out of the cylinder, so that the drive need not be loosened when lifting the supporting member off the frame. The described type of pivotal links has moreover proved best for swivelling or tilting, respectively, the supporting member without problems out of the entered position of the container into its discharge position.

For stiffening the construction it is of advantage if said both pairs of pins are arranged on a common base plate of the supporting member, which base plate can, if desired, also be used for supporting the bearing pulleys. A further development of the invention consists in this case in that the supporting member forms, together with an extension protruding beyond the charging opening of the container a chute for the material discharged from the container, noting that preferably lateral cheeks of the supporting member, which cheeks shield the bearing pulleys, are elongated for forming lateral wings of the chute. This chute facilitates transfer of the massaged material out of the container into an other container, for example a transport carriage or the like, the lateral wings of the chute preventing meat parts from rolling over the lateral edges of the chute.

Of course care must be taken that the container can not slide off the supporting member when performing the tilting movement or even during the massageing step. In the initially described known construction this is achieved—till arriving at the massaging position of the container and during the rotation of the container—by a bottom plate connected to the supporting member, noting that the container drives against this bottom plate during entering the frame or the supporting member, respectively, and that the container always contacts with its chassis this bottom plate, so that the wheels or rolls of the chassis move on the bottom plate along circular pathes. According to the invention, the container is in a similar manner secured against sliding off the supporting member in discharge position of the container, noting that the security means is, according to the invention, preferably formed by the fact that the container is provided on its circumference with a circumferential flange engaging in discharge position of the container an abutment of the supporting member, which abutment protrudes in direction to the axis of the container. This abutment is preferably formed of a collar of that end of the supporting member which in discharge position is located at a low level. The distance with which the collar is arranged from the bottom plate of the supporting member must, of course, be adapted to the height of the container.

For relieving the tilting pins from stress during the massageing step requiring under circumstances a longer time interval, an additional supporting means for the supporting member can, according to the invention, be provided on the frame in that position of the supporting member which is associated to its position for rotating the container.

BRIEF DESCRIPTION OF THE DRAWINGS

The subject of the invention is schematically represented with respect to an example of embodiment shown in the annexed drawings.

In the drawing:

FIG. 3 shows the equipment in the position in which the container is rotated for the purpose of massageing the meat contained therein, FIG. 4 is a top plan view of FIG. 3, FIG. 5 shows the equipment in the discharge position of the container and FIG. 6 is a top plan view of FIG. 5.

DETAILED DESCRIPTION OF THE DRAWINGS

Figure 1:
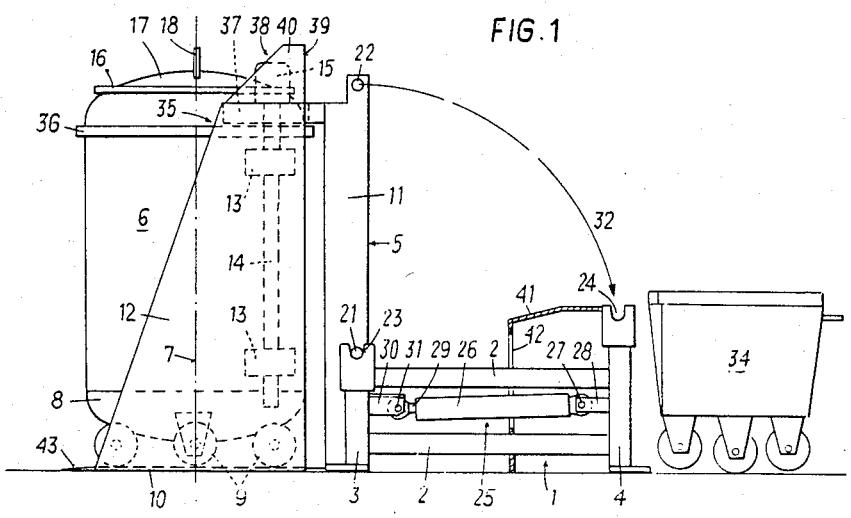
FIG. 1 shows a side elevation of the equipment in the entered position of the container.
Figure 2:
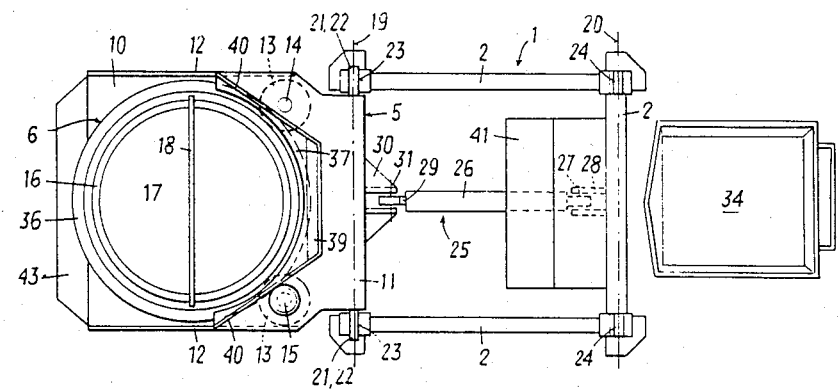
FIG. 2 shows a top plan view of FIG. 1.

The equipment consists of a stationary frame 1 having four uprights 3, 4 connected one with the other by cross beams 2, said uprights serving the purpose of tiltably supporting a supporting member 5 for the container 6 for the meat to be massaged. The container 6 is at its circumference axially symmetric relative to its axis 7 and preferably provided with a cylindrical mantle. The container 6 has a bottom 8 being provided with a chassis 9 formed of a plurality of rollers. By means of this chassis 9, the container 6 can be moved onto a bottom plate 10 of the supporting member 5. This bottom plate 10 is, like two lateral cheeks 12, rigidly connected to a back plate 11 of the supporting member 5. The constructional parts 10, 11 and 12 form in common a trough-like supporting member 5 for the container while tilting same, so that the container 6 is reliably maintained in position. The container 6 can be shifted into this supporting member 5 until engagement of its mantle on bearing pulleys 13, of which two pairs are arranged on two common shafts 14 located, in the position of the container 6 shown in FIG. 1, at both sides of the container within the area of the cheeks 12. Of these shafts 14, at least the one, however preferably both, is driven by a motor 15 via a chain drive. The motor 15 can be swivelled together with the supporting member 5.

On top, the container 6 is provided with a charging opening 16 which can be tightly closed by a cover 17. Connection pieces for a vacuum conduit may be provided in the cover 17 for maintaining the container 6 and the meat contained therein, respectively, under sub-atmospheric pressure during certain treatment procedures. For facilitating manipulation of the cover, a handle 18 is additionally fixed to the cover 7.

The supporting member 5 can, together with the container 6, be swivelled around a horizontal axis 19 from the entered position of the container 6 shown in FIG. 1 into the massageing position of the container shown in FIG. 3 and can be swivelled around a further axis 20 parallely extending relative to the axis 19 from the massageing position into the discharge position of the container 6 shown in FIG. 5. The tilting axes 19, 20 are formed of two pairs 21 and 22, respectively, of pins. Both pins of each of these pair of pins are fixed to the back plate 11 of the supporting member 5 in coaxial relation and alternately rest during the tilting movement in forks 23 and 24, respectively, being open in upward direction and being fixed to the upper ends of the uprights 3 and 4, respectively. The tilting drive 25 is formed of a pressurized fluid cylinder 26 which is linked at 27 to a console 28 of the frame 1 and which has its piston rod 29 linked to a console of the back plate 11 by bracket 30 at the position 31. The linking point 31 is located at a lower level than the axis 19 and the linking point 27 is located at a lower level than the axis 20. When pressurizing the pressurized fluid cylinder 26, the supporting member 5 is, after having entered the container 6 into this supporting member, tilted around the axis 19 until the pins 22 being swivelled in direction of the arrow 32 (FIG. 1) have engaged the fork 24. This position of the supporting member 5 and of the container 6 carried by this supporting member 5, respectively, corresponds to the massageing position (FIG. 3), which is conveniently supervised by means of a limit switch and in which the container 6 is rotated around its axis 7 by means of the motor 15 on the bearing pulleys 13, which are, for exerting a better driving action on the container 6, optionally provided with a friction-increasing layer, for example of rubber, equally acting as a silencer.

For moving the container 6 into the discharge position shown in FIG. 5, the tilting drive is further actuated, so that the piston rod 29 is further extended out of the pressurized fluid cylinder 26 (FIGS. 3, 5). Thus, the tilting axis 20 formed of the pins 22 becomes effective, whereas the pins 21 are lifted out of the forks 23 and swivelled in upward direction and in direction of the arrow 33 (FIG. 5). The container 6 thus arrives in a discharge position in which its charging opening 16 is located below or faces in downward direction. After having removed the cover 17, the material contained within the container 6 can be discharged, for example into a transport carriage 34.

For facilitating removal of the cover 17 and for preventing that removal of the cover is obstructed by the charged material exerting within the container 6 a pressure in direction to the cover, it is to recommend that the container is, prior to being tilted out of its massageing position (FIG. 3) into its discharge position (FIG. 5) first tilted back into the entered position (FIG. 1) and to remove the cover 17 in this position of the equipment. It is only then that the container can be tilted in one single stroke into the discharge position (FIG. 5).

For preventing the container 6 from sliding off the supporting member 5 in the discharge position (FIG. 5), a security means 35 is present for preventing such sliding movement. This security means consists of a circumferential flange 36 on the circumference of the container 6, which flange 36 contacts in discharge position of the container 6 an abutment 37 protruding in direction to the container axis 7. This abutment 37 is formed of a collar provided on that end of the supporting member which is located below in the discharge position.

For preventing any spilling of charged material when emptying the container 6 (FIG. 5), the supporting member 5 forms together with an extension 38 protruding beyond the charging opening 16 of the container a chute 39 for the material emerging from the container 6, noting that the lateral cheeks of the supporting member 5, which cheeks shield the bearing pulleys 13, are conveniently elongated to form lateral wings 40 of the chute 35.

An additional support means 41 for the supporting member assuming massageing position (FIG. 3) can be provided within the frame 1 for the purpose of releasing the pins 21, 22 from stress during the massaging operation. This support means 41 must, of course, have an opening 42 for accommodating the swivelling movement of the pressurized fluid cylinder 26. The support means 41 can be used for housing equipment components, for example the hydraulic device.

The bottom plate 10 can be provided with a chamfer 43 on its front edge for facilitating rolling movement of the carriage 6, the described tilting operations and rotating operations can easily automatically be controlled by means of limit stops.

What is claimed is:
1. Equipment for massaging meat comprising:
an axially symmetric container having an axis, a sidewall, a top, an access opening at the top, a bottom, and a removable cover for closing the access opening, the container being supportable in an upright orientation by wheel means at the bottom;
a support frame for receiving and supporting the container;
support frame positioning means for positioning the support frame in an upright position, a first tilted position and a second tilted position;
the support frame having an open side and a frame bottom for rolling the container onto and off of the frame bottom when the support frame is in its upright position and the container is in its upright orientation;
roller means, mounted to the frame, for rotatably and supportably engaging the container sidewall when the support frame and container therewith is in the first tilted position with the wheel means rotatably engaging the frame bottom; and
means for driving the container about the container axis when the support frame and container therewith is in the first tilted position.
2. The equipment of claim 1 wherein the support frame includes generally triangularly shaped sidewalls and a backwall partially enclosing the container therein.
3. The equipment of claim 1 wherein the container axis when the container is in the first tilted position is at an acute angle above a horizontal plane.
4. The equipment of claim 1 wherein the container axis when the container is in the second tilted position is at an acute angle below a horizontal plane so the contents of the container can be discharged through the access opening when the cover is removed.
5. The equipment of claim 1 wherein the roller means includes four rollers.
6. The equipment of claim 1 wherein the container driving means includes a motor operably coupled to said roller means so said roller means supports and drives the container when the support frame and container therewith is in the first tilted position.
7. The equipment of claim 1 wherein the support frame positioning means includes a cylinder and piston.
8. The equipment of claim 1 wherein said frame positioning means includes means for tilting the support frame and container therewith about a first horizontal axis when going from the upright position to the first tilted position.

9. The equipment of claim 1 wherein said support frame positioning means includes means for tilting the support frame and container therewith about a first horizontal axis when moving between the upright position and the first tilted position and about a second horizontal axis when moving between the first tilted position and the second tilted position.

10. The equipment of claim 9 wherein the second horizontal axis is at a higher elevation than the first horizontal axis.

11. The equipment of claim 9 wherein said support frame positioning means includes first and second pin and fork assemblies defining the first and second horizontal axes.

12. The equipment of claim 9 wherein said frame positioning means includes first and second pins mounted to the frame and first and second forks positioned for receipt of the first and second pins, the first pin engaging the first fork and defining the first horizontal axis when the support frame and container therewith are at and between the upright and first tilted positions, the second pin engaging the second fork and defining the second horizontal axis when the support frame and container therewith are at and between the first and second tilted positions.

13. The equipment of claim 12 wherein the support frame includes a back wall and the support frame positioning means includes a plurality of first pins and a plurality of second pins mounted to the back wall.

14. The equipment of claim 12 wherein the support frame positioning means includes a cylinder and piston means for continuously moving the support frame and container therewith from the upright to the first tilted and to the second tilted positions by a continuous extension of the piston.

15. The equipment of claim 1 further comprising means for at least partially supporting the support frame when the support frame is in the first tilted position.

16. The equipment of claim 1 wherein the support frame includes a back wall and the roller means includes rollers supported by the back wall.

17. The equipment of claim 16 wherein the support frame includes sidewalls positioned external of the rollers.

18. The equipment of claim 2 wherein the frame sidewalls and back wall extend past the container access opening to form a material discharge chute.

19. The equipment of claim 4 further comprising security means for preventing the container from sliding out of the support frame when the support frame and container therewith are in the second tilted position.

20. The equipment of claim 19 wherein the security means includes a circumferential flange on the container and a complementary abutment on the frame.

* * * * *